United States Patent
Wimmer et al.

(10) Patent No.: US 12,104,667 B2
(45) Date of Patent: Oct. 1, 2024

(54) BRAKE SYSTEM HAVING MULTIPLE PRESSURE PISTONS FOR AN ELECTRIC WHEEL DRIVE UNIT, AND WHEEL DRIVE UNIT

(71) Applicant: Schaeffler Technologies AG & Co. KG, Herzogenaurach (DE)

(72) Inventors: Doris Maria Wimmer, Ottenhöfen (DE); Simon Ortmann, Baden-Baden (DE); Philippe Wagner, Souffelweyersheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 679 days.

(21) Appl. No.: 17/312,305

(22) PCT Filed: Dec. 6, 2019

(86) PCT No.: PCT/DE2019/101051
§ 371 (c)(1),
(2) Date: Jun. 9, 2021

(87) PCT Pub. No.: WO2020/119859
PCT Pub. Date: Jun. 18, 2020

(65) Prior Publication Data
US 2022/0025944 A1    Jan. 27, 2022

(30) Foreign Application Priority Data
Dec. 12, 2018 (DE) .......................... 102018131876.6

(51) Int. Cl.
*F16D 55/36* (2006.01)
*B60K 7/00* (2006.01)
(Continued)

(52) U.S. Cl.
CPC ............ *F16D 55/40* (2013.01); *B60K 7/0007* (2013.01); *F16D 65/186* (2013.01); *B60B 27/04* (2013.01);
(Continued)

(58) Field of Classification Search
CPC .... B60K 2007/0038; B60K 2007/0092; B60K 7/0007; F16D 55/40; F16D 55/32;
(Continued)

(56) References Cited

U.S. PATENT DOCUMENTS 2,968,372 A * 1/1961 Kern ....................... F16D 55/40
188/71.6
2,970,673 A * 2/1961 Isbell .................... B60T 17/222
192/111.1
(Continued)

FOREIGN PATENT DOCUMENTS

CN 104640731 A 5/2015
CN 108569083 A 9/2018
(Continued)

*Primary Examiner* — Nicholas J Lane

(57) ABSTRACT

A brake system for an electric wheel drive unit has a housing that can be attached securely to the vehicle frame. The housing has a flange region and a shaft-like wheel carrier region secured to the flange region. A first brake component is connected to the housing and includes a first support part attached directly on a radial outer side of the wheel carrier region and a first brake disc element rotationally fixed to the first support part. A second brake component is rotatably mounted relative to the housing and has a second support part and a second brake disc element rotationally fixed to the second support part. A hydraulic actuation device is provided with one or more pressure pistons arranged. A sliding element is provided for moveably coupling the pressure pistons with one of the brake disc elements.

8 Claims, 2 Drawing Sheets

(51) Int. Cl.
  *F16D 55/40* (2006.01)
  *F16D 65/18* (2006.01)
  *B60B 27/04* (2006.01)
  *F16D 65/78* (2006.01)
  *F16D 121/04* (2012.01)
  *F16D 127/02* (2012.01)
(52) U.S. Cl.
  CPC ............ *B60K 2007/0092* (2013.01); *F16D 2065/785* (2013.01); *F16D 2121/04* (2013.01); *F16D 2127/02* (2013.01)
(58) Field of Classification Search
  CPC ............ F16D 2125/50; F16D 65/186; F16D 2127/02; F16D 2065/785; F16D 2121/04
  See application file for complete search history.

(56) References Cited

U.S. PATENT DOCUMENTS

| | | | | |
|---|---|---|---|---|
| 3,044,808 | A * | 7/1962 | Osborne | F16D 65/46 74/531 |
| 3,105,575 | A * | 10/1963 | Dewar | F16D 65/121 188/218 XL |
| 3,142,360 | A * | 7/1964 | Kelemen | B64C 25/42 188/264 AA |
| 3,653,472 | A * | 4/1972 | Dowell | F16D 55/40 188/72.4 |
| 3,812,928 | A | 5/1974 | Rockwell et al. | |
| 3,970,174 | A * | 7/1976 | Kirkhart | C04B 35/52 188/251 A |
| 4,069,745 | A * | 1/1978 | Stinson | F16D 55/40 137/204 |
| 4,560,034 | A * | 12/1985 | Windish | F25B 5/00 188/170 |
| 5,107,968 | A * | 4/1992 | Delpassand | B60C 23/18 188/264 G |
| 5,172,797 | A | 12/1992 | Stout et al. | |
| 6,264,009 | B1 * | 7/2001 | Johnson | F16D 55/40 192/70.23 |
| 6,945,371 | B2 * | 9/2005 | Schmidt | F16D 25/0638 188/71.6 |
| 8,434,607 | B2 * | 5/2013 | Nausieda | F16D 25/0638 192/221 |
| 8,978,799 | B2 * | 3/2015 | Arnold | B60K 6/48 310/78 |
| 2004/0154894 | A1 * | 8/2004 | Braford, Jr. | F16D 25/0638 192/106 F |
| 2007/0039796 | A1 * | 2/2007 | Schroder | F16D 25/0638 192/85.61 |
| 2009/0057088 | A1 * | 3/2009 | Sakai | F16D 25/123 192/70.12 |
| 2009/0250305 | A1 * | 10/2009 | Sawayanagi | F16D 25/0638 192/70.12 |
| 2019/0257376 | A1 * | 8/2019 | Yamakawa | F16H 63/3026 |

FOREIGN PATENT DOCUMENTS

| | | |
|---|---|---|
| DE | 19732637 A1 | 2/1999 |
| DE | 10331186 A1 | 1/2005 |
| DE | 102012208920 A1 | 12/2013 |
| DE | 102018128771 A1 | 5/2020 |
| DE | 102018130817 A1 | 6/2020 |
| DE | 102018131958 A1 | 6/2020 |
| JP | S6392837 A | 4/1988 |
| JP | 2006528331 A | 12/2006 |
| JP | 2008037303 A | 2/2008 |
| JP | 2011179561 A | 9/2011 |
| JP | 2012144228 A | 1/2014 |
| JP | 2015509876 A | 4/2015 |
| JP | 2018522188 A | 8/2018 |
| WO | 2014168034 A1 | 10/2014 |
| WO | 2019185092 A1 | 10/2019 |
| WO | WO-2021000987 A1 * | 1/2021 ............ F16D 55/40 |

* cited by examiner

BRAKE SYSTEM HAVING MULTIPLE PRESSURE PISTONS FOR AN ELECTRIC WHEEL DRIVE UNIT, AND WHEEL DRIVE UNIT

CROSS-REFERENCE TO RELATED APPLICATIONS

This application is the U.S. National Phase of PCT Appln. No. PCT/DE2019/101051 filed Dec. 6, 2019, which claims priority to DE 102018131876.6 filed Dec. 12, 2018, the entire disclosures of which are incorporated by reference herein.

TECHNICAL FIELD

The disclosure relates to a brake system for an electric wheel drive unit, in particular a wheel-integrated wheel drive unit (wheel hub drive) for a preferably two-, three-, or four-wheeled motor vehicle. The disclosure also relates to an electric wheel drive unit having this brake system.

BACKGROUND

With regard to electric drives, electric wheel hub drives require the most compact possible integration of the drive components with a corresponding brake system. Furthermore, a structure that is as simple as possible is desired to keep the manufacturing and assembly costs simple. In the implemented versions, the components should be implemented in a correspondingly robust manner due to the relatively high masses.

SUMMARY

It is therefore the object of the present disclosure to provide a brake system for an electric wheel drive unit that can be assembled with as few individual components as possible in as few assembly steps as possible, wherein at the same time, a compact and robust construction is ensured.

This is achieved according to the disclosure described herein. Accordingly, a brake system for an electric wheel drive unit (also referred to as a wheel hub drive unit) having a housing that can be attached securely to the vehicle frame, which housing has a flange region and a shaft-like wheel carrier region secured to the flange region, a first brake component connected to the housing, wherein the first brake component has first support part directly attached to a radial outer side of the wheel carrier region and a first brake disc element rotationally fixed to the first support part, a second brake component rotatably mounted relative to the housing, wherein the second brake component has a second support part and a second brake disc element, which is rotationally fixed to the second support part which is designed and arranged for the frictional connection with the first brake disc element, as well as a hydraulic actuation device provided with one or more pressure pistons, wherein the actuation device is arranged such that the pressure piston or the pressure pistons are arranged in a radial direction of an axis of rotation of the second brake component within the brake disc elements and a sliding element, moveably coupling the pressure piston or the pressure pistons with one of the brake disc elements, is arranged/runs at a distance from the first support part both in the radial direction and in an axial direction of the axis of rotation. Thus, the sliding element is arranged in the circumferential direction without overlapping the first support part.

This design of the brake system results in the most compact possible nesting of the brake disc elements with the actuating device on the one hand, and on the other hand the structure is kept as simple as possible and the individual components can be made particularly robust. Above all, the sliding element does not need to be provided with openings for the through-passage of one of the brake components, whereby the strength of the sliding element and of the first support part is significantly increased. The result is a particularly long-lasting design of the corresponding brake system.

Further advantageous embodiments are explained in more detail below.

If a plurality of first brake disc elements and/or second brake disc elements which are (axially) moveable relative to one another are provided, a high braking torque can be generated.

It has been found to be particularly useful if there are two first brake disc elements and one second brake disc element axially arranged between the two first brake disc elements, so that there is a good compromise between the number of components and the achievable braking torque.

It is also advantageous if a counterpressure plate is arranged on an axial side of the assembly of brake disc elements facing away from the sliding element and the counterpressure plate is secured (in particular axially supported) directly to the outer side of the wheel carrier region. This further simplifies the construction.

If the counterpressure plate is fixed in the axial direction by a nut screwed onto the wheel carrier region, the counterpressure plate is supported in a stable manner, so that a high braking torque can be generated during operation.

In this context, it is also advantageous if the counterpressure plate is also supported axially on the first support part. The counterpressure plate is consequently preferably clamped axially directly between the first support part and the nut. This results in an even simpler structure.

If a cylinder housing that houses the pressure piston or pistons is secured directly to the flange region, assembly is rendered even simpler.

The available installation space is used even more intensively when a biasing spring that pushes the sliding element away from the brake disc elements is inserted/clamped axially between the sliding element and the first support part.

With regard to the further design of the brake disc elements, it is also advantageous if the at least one first brake disc element is provided with a friction lining. As an alternative to this, however, it is also possible to equip the second brake disc element with a friction lining (for each first brake disc element).

The second brake disc element is particularly preferably implemented as a purely one-piece steel plate and the at least one first brake disc element, preferably each of the two first brake disc elements, is provided with a steel body and the friction lining applied to the second brake disc element.

To enable the most compact possible nesting with an electric motor, it is also advantageous if a heat protection shield is attached to the housing radially outside the brake disc elements.

The disclosure also relates to an electric wheel drive unit (wheel hub drive unit) for an electric vehicle, wherein this wheel drive unit is provided with a wheel rim, an electric motor housed in the wheel rim, and a brake system according to the disclosure, wherein the second brake component is directly or indirectly rotatably coupled with the wheel rim.

In this context, it is particularly expedient if the second brake component is rotatably coupled to the wheel rim indirectly via a gear, particularly preferably a planetary gear.

Furthermore, it is expedient if the electric motor is arranged to be offset axially and/or radially (preferably with the stator thereof) from the brake system. This results in a particularly compact, efficient wheel drive unit.

In other words, a preferably full-surface multi-piston brake (brake system) for an e-wheel application is implemented in a through-passage-free design. The inner plate carrier (first support part) and the pressure plate (counter-pressure plate) are now secured to the wheel carrier (wheel carrier region). An actuating housing (cylinder housing) and actuating elements (pressure pistons) are arranged on the wheel carrier flange (flange region). The power flow goes through a nut via the wheel carrier to the flange (flange region).

BRIEF DESCRIPTION OF THE DRAWINGS

The disclosure will now be explained in more detail below with reference to figures, in which context various exemplary embodiments are also shown in principle.

In the drawings.

The figures are only schematic in nature and serve only for understanding the disclosure. The same elements are provided with the same reference numbers.

DETAILED DESCRIPTION

Figure 1:
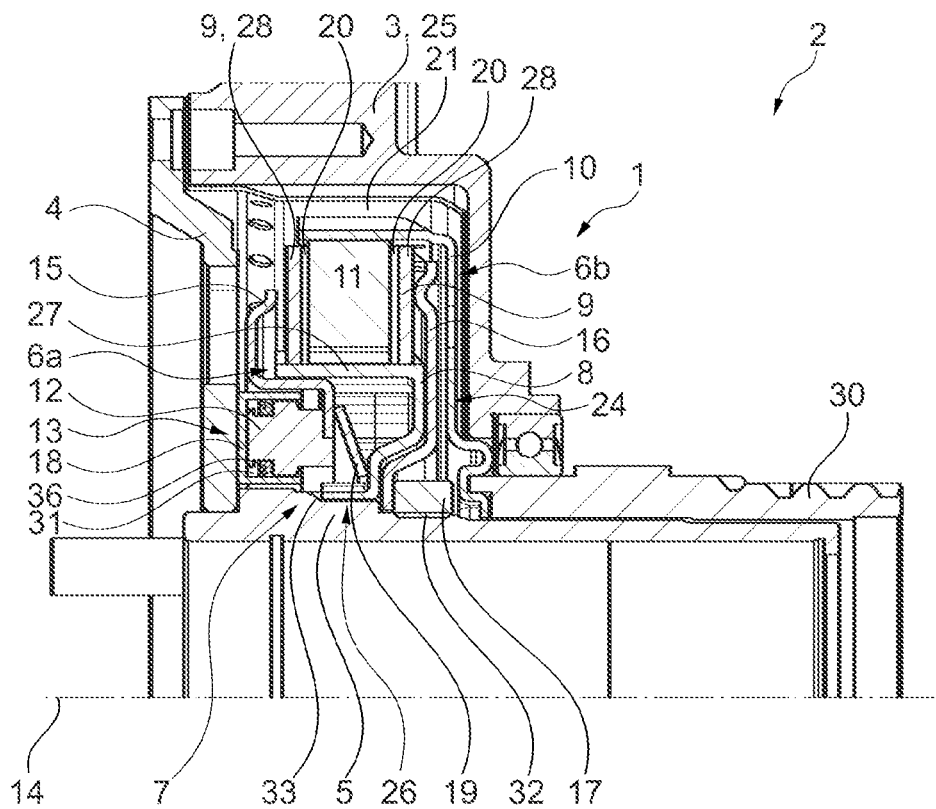
FIG. 1 shows a longitudinal sectional view of a brake system according to the disclosure.
Figure 3:
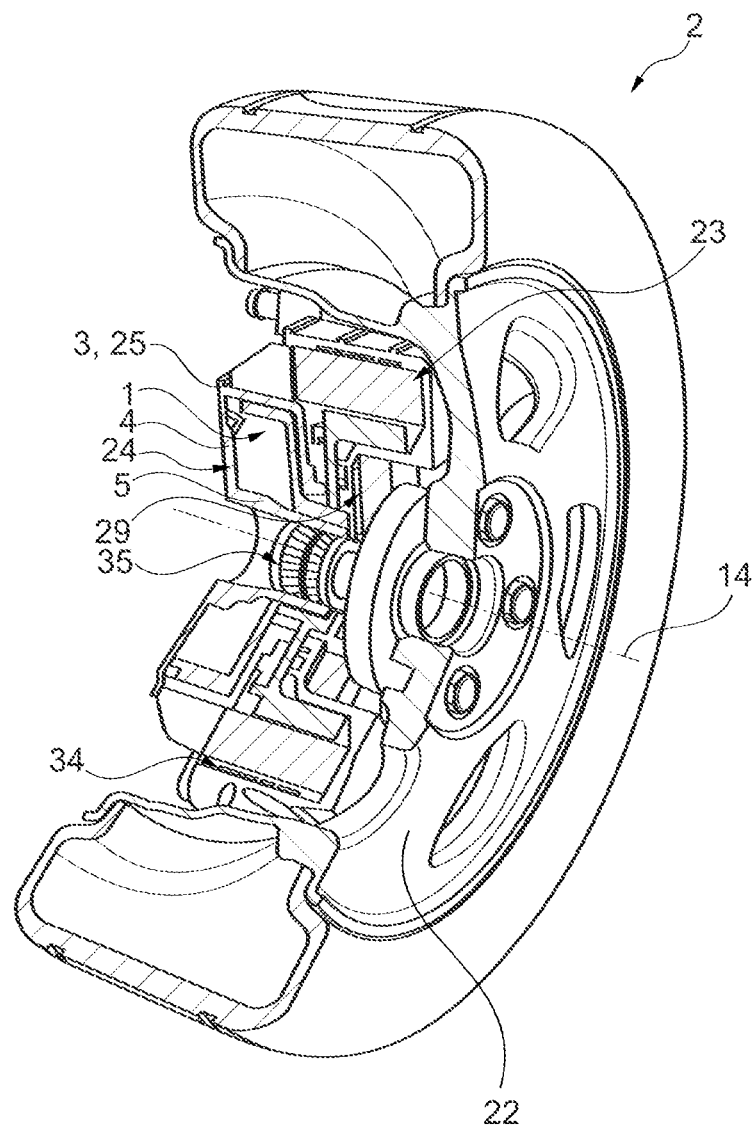
FIG. 3 shows a perspective partial sectional view of a wheel drive unit having the brake system, wherein the brake system is shown only schematically and the basic structure of the wheel drive unit is clarified.

In FIG. 1, the detailed structure of a brake system 1 according to the disclosure can be seen. With FIG. 3, the preferred region of application of this brake system 1 is also illustrated. The brake system 1, shown only schematically in FIG. 3, is integrated in an electric wheel drive unit 2 according to a preferred embodiment. The wheel drive unit 2 represents a wheel hub drive unit 2, wherein both the brake system 1 and an electric motor 23 provide the drive being integrated within a wheel rim 22 for an electric vehicle. During operation, the wheel rim 22 is supported in a typical manner via a wheel hub on a housing 3 that can be attached securely to the vehicle frame. The wheel rim 22 is mounted relative to the housing 3 via a further bearing 35.

The direction designations axial, radial and in the circumferential direction in the following relate to a central axis of rotation 14 of the wheel rim 22/of a second brake component 6b of the brake system 1. Consequently, an axial direction is a direction along the axis of rotation 14, a radial direction is a direction perpendicular to the axis of rotation 14 and a circumferential direction is a circular line that runs concentrically around the axis of rotation 14.

Returning to FIG. 1, the design of the housing 3 of the brake system 1/the wheel drive unit 2 in the region of the brake system 1 can be seen in detail. In the following description, the housing 3 is assigned to the brake system 1, but in principle it is also the housing 3 of the wheel drive unit 2 and accordingly houses the electric motor 23 (including a liquid cooling device 34 for the electric motor 23) in a further region. The housing 3 forms a receiving space 24, which can be seen in FIG. 1, for the components of the brake system 1. The receiving space 24 is delimited on a first axial side by a flange region 4 in the form of a cover-shaped flange element. On the radial inside thereof, the receiving space 24 is delimited by a shaft-like/pin-like wheel carrier region 5. The wheel carrier region 5 is rigidly connected to the flange region 4. The wheel carrier region 5 thus directly forms the housing that can be attached securely to the vehicle frame during operation, as already mentioned. The wheel carrier region 5 is formed separately from the flange region 4. On a radial outer side and a second axial side facing away from the flange region 4, the receiving space 24 is delimited by a main housing part 25 extending in the axial direction and in the radial direction.

In the receiving space 24, a first brake component 6a is fixed to the housing, i.e., can be attached rigidly to the housing 3 and thus to the vehicle frame to during operation. The second brake component 6b interacts with the first brake component 6a, which is rotationally coupled to the wheel rim 22 during operation and is frictionally connected to the first brake component 6a to brake the wheel rim 22 in a braking state of the wheel drive unit 2.

The two brake components 6a, 6b each have a support part 8, 10 and at least one brake disc element 9, 11, which is connected to the respective support part 8, 10. Accordingly, the first brake component 6a has a first support part 8, which is also referred to as an inner carrier/inner-plate carrier. This first support part 8 is directly attached with the radial inner side thereof to a radial outer side 7 of the wheel carrier region 5. For this purpose, a toothing 26 designed as a plug-in toothing is preferably used, which connects the two components—wheel carrier region 5 and first support part 8—with one another in a form-fitting manner in the direction of rotation. On a side facing radially away from the toothing 26, the first support part 8 forms a sleeve region 27 on which two first brake disc elements 9 are housed so as to be moveable relative to one another, but in a rotationally fixed manner. The two first brake disc elements 9 are designed to be essentially plate-like. The two first brake disc elements 9 have a disc-shaped steel support/steel body 28 as well as a friction lining 20 arranged towards a second brake disc element 11 of the second brake component 6b. The second brake disc element 11 is arranged between the two first brake disc elements 9, seen in the axial direction along the axis of rotation 14. The second brake disc element 11 is received on a second support part 10 of the second brake component 6b, designed as an outer carrier/outer plate carrier, in a rotationally fixed manner, but moveable in the axial direction.

The second brake component 6b is typically mounted so as to be rotatable relative to the housing 3. As can be seen schematically in FIG. 3, the second brake component 6b is indirectly coupled to the wheel rim 22 via a planetary gear 29. The planetary gear 29 is received in a housing 3. In FIG. 1, a sun gear 30 of the planetary gear 29 can be seen, which sun gear 30 is rigidly connected to the second support part 10.

A hydraulic actuating device 13 is typically provided for actuating the brake system 1, i.e., for frictional connection of the first and second brake components 6a, 6b to one another. This hydraulic actuating device 13 has a cylinder housing 18 which is secured to the flange region 4. The cylinder housing 18 is arranged outside of the wheel carrier region 5 in the radial direction. The cylinder housing 18 is also arranged in the radial direction inside the brake disc elements 9, 11. A plurality of pressure pistons 12 of the actuating device 13, which are arranged in a distributed manner in the circumferential direction, are moveably received in the cylinder housing 18 so as to be moveable in the axial direction, as can also be seen in FIG. 2. The pressure pistons 12 are non-moveably coupled to a sliding element 15 and have an adjusting effect on the relative position of the first and second brake components 6a, 6b via this sliding element. The sliding element 15 thus serves to pass on a (braking) actuation force during operation.

According to the disclosure, the sliding element 15 is arranged along the course thereof in a through-passage-free manner to the first support part 8 and is consequently arranged via the extension thereof in the longitudinal section at a distance from the first support part 8 in the axial direction and in the radial direction as seen according to FIG. 1.

The sliding element 15 extends from an end on the pressure piston side in the radial direction outward and is arranged with a radially outer end in the radial direction at the same height as the brake disc elements 9, 11. The sliding element 15 is thus shaped in such a way that, during operation, it transmits a braking force generated by hydraulic pressure to the pressure piston 12 on a brake disc element arranged at the end from the assembly of first and second brake disc elements 9, 11, here one of the first brake disc elements 9. When the actuating device 13 is activated, hydraulic pressure is applied to a pressure chamber 31 formed between the cylinder housing 18 and the pressure piston 12 (sealed with a seal 36) so that the pressure pistons 12 extend in the axial direction. As a result, the sliding element 15 is pressed against the brake disc elements 9, 11 and these come into frictional contact with one another.

To support the braking force/actuation force generated by the actuating device 13, a counterpressure plate 16 is provided on a side axially facing away from the sliding element 15 in relation to the assembly of the first and second brake disc elements 9, 11. The counterpressure plate 16 is arranged on a side of the first support part 8 axially facing away from the pressure piston 12. It can be seen here that the radial inside of the counterpressure plate 16 is also fixed on the outer side 7 of the wheel carrier region 5. In this embodiment, a nut 17, which is screwed onto an (external) thread 32 of the wheel carrier region 5, serves to axially fix the counterpressure plate 16. The counterpressure plate 16 is thus fixed in the axial direction between the first electric machine 8 and the nut 17. Furthermore, the first support part 8 is fixed between the counterpressure plate 16 and a radial shoulder 33 of the wheel carrier region 5.

It can also be clearly seen in FIG. 1 that a heat protection shield 21 is attached radially outside the two brake components 6a, 6b. The heat protection shield 21 extends in the receiving space 24 in the axial direction over the entire length of the first brake component 6a and over the majority of the second brake component 6b. The heat protection shield 21 covers the brake disc elements 9, 11 radially from the outside.

A biasing spring 19 is provided to support the actuating device 13 in an initial position, which corresponds to an open position of the brake system 1. In this embodiment, the biasing spring 19 is directly arranged axially between the sliding element 15 and the first support part 8 and radially inside the brake disc elements 9, 11.

For the sake of completeness, it should also be noted that the brake disc elements 9, 11 can also be implemented in the opposite manner. Accordingly, it is in principle also possible to provide not the first brake disc elements 9, but rather the second brake disc element 11 with a friction lining 20 facing the respective first brake disc element 9.

Figure 2:
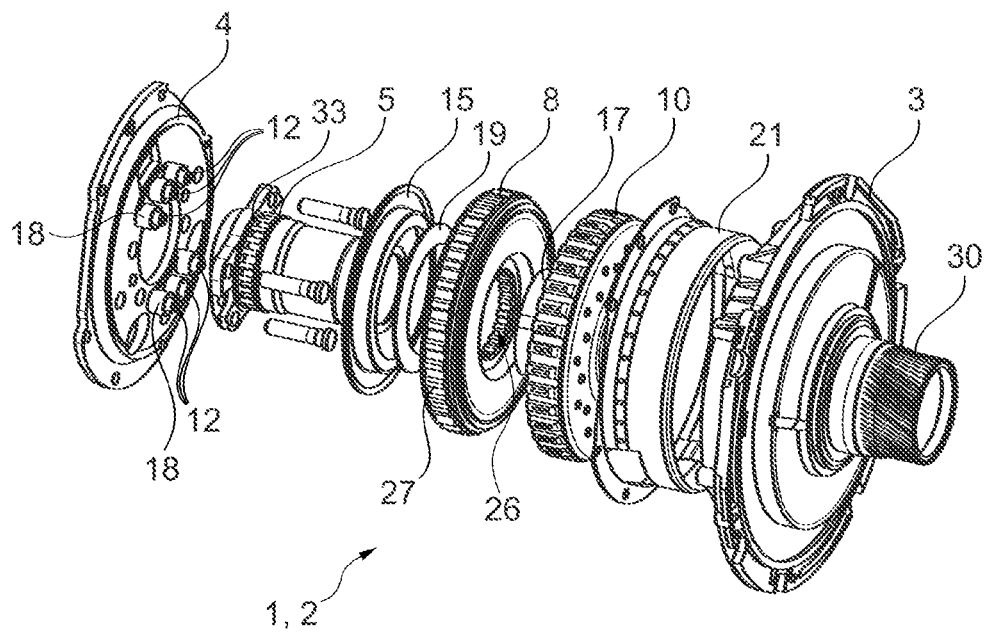
FIG. 2 shows a perspective exploded view of the brake system according to FIG. 1.

In other words, the arrangement according to the disclosure is characterized in that the inner plate carrier 8 (with the help of a soothing 26 (or similar)) and the pressure plate 16 are attached directly to the wheel carrier 5, while the actuating housing (cylinder housing 18) and the actuating elements (sliding element 15, pressure piston 12, and seal 36) are secured to the wheel carrier flange 4. As can be seen in FIG. 1, the inner plate carrier 8 and the pressure plate 16 are fixed on the wheel carrier 5 with a nut 17. The actuation force is supported by this nut 17 via the plate pack (first brake disc elements 9 (with steel body 28 and friction lining 20) and second brake disc element 11). The braking torque is introduced via the shaft (sun gear 30) coming from the planetary set, from there to the outer plate carrier 10, then to the plate pack 9, 11 and the inner plate carrier 8, which is supported on the wheel carrier 5. The actuation force is generated hydraulically via the actuation elements 12, 15, 36, transferred to the plate pack 9, 11 with the aid of the pressure pot (sliding element 15), and supported on the pressure plate 16. From there the power flow goes to the nut 17 via the wheel carrier 5 to the wheel carrier flange 4. The restoring element (biasing spring 19) keeps the plates 9, 11 open in the non-actuated state. In FIG. 2, the components can be seen in the corresponding assembly sequence. It can be seen that the components 8 and 15 are designed to be significantly more robust (without through-passages). In general, both a single-disc and a multi-disc concept are conceivable, as well as rotating or stationary linings and/or steel masses.

LIST OF REFERENCE NUMBERS

1 Brake system
2 Wheel drive unit
3 Housing
4 Flange region
5 Wheel carrier region
6a First brake component
6b Second brake component
7 Outer side
8 First support part
9 First brake disc element
10 Second support part
11 Second brake disc element
12 Pressure piston
13 Actuating device
14 Axis of rotation
15 Sliding element
16 Counterpressure plate
17 Nut
18 Cylinder housing
19 Biasing spring
20 Friction lining
21 Heat protection shield
22 Wheel rim
23 Electric motor
24 Receiving space
25 Main housing part
26 Toothing
27 Sleeve region
28 Steel body
29 Planetary gear
30 Sun gear
31 Pressure chamber 32 Thread
33 Shoulder
34 Cooling device
35 Bearing
36 Seal

The invention claimed is:

1. A brake system for an electric wheel drive unit, comprising:
- a housing configured to be secured to a vehicle frame, which housing has a flange portion and a wheel carrier portion secured to the flange portion,
- a first brake component connected to the housing, the first brake component having a first support part attached directly to a radial outer side of the wheel carrier portion and a first brake disc element rotationally fixed to the first support part,
- a second brake component rotatably mounted relative to the housing, the second brake component having a second support part and a second brake disc element which is rotationally fixed to the second support part, and which is designed and arranged for frictional connection with the first brake disc element, and
- a hydraulic actuating device provided with at least one or more pressure pistons, the actuating device being arranged such that the pressure pistons are arranged in a radial direction of an axis of rotation of the second brake component within the brake disc elements and a sliding element moveably coupling the one or more pressure pistons with one of the brake disc elements, wherein:
- a counterpressure plate is arranged on an axial side of the brake disc elements facing away from the sliding element and the counterpressure plate is secured directly on the outer side of the wheel carrier portion; and
- the counterpressure plate is fixed in the axial direction by a nut screwed onto the wheel carrier portion.

2. The brake system according to claim 1, further comprising:
- an additional first brake disc element movable relative to the first disc brake element; or
- an additional second brake disc element moveable relative to the second brake disc element.

3. The brake system according to claim 1, wherein the counterpressure plate is axially supported on the first support part.

4. The brake system according to claim 1, wherein a cylinder housing receiving the one or more pressure pistons is directly secured to the flange portion.

5. The brake system according to claim 1, wherein a biasing spring pushing the sliding element away from the brake disc elements is inserted axially between the sliding element and the first support part.

6. The brake system according to claim 1, wherein the first brake disc element or the second brake disc element is provided with a friction lining.

7. The brake system according to claim 1, wherein a heat protection shield is attached to a housing radially outside the brake disc elements.

8. An electric wheel drive unit for an electric vehicle, comprising a wheel rim, an electric motor housed in the wheel rim and the brake system according to claim 1, wherein the second brake component is directly or indirectly rotatably coupled to the wheel rim.

* * * * *